(12) United States Patent
Okada et al.

(10) Patent No.: US 7,667,357 B2
(45) Date of Patent: Feb. 23, 2010

(54) MOTOR HAVING SHAFT MEMBERS

(75) Inventors: Takeshi Okada, Fukui (JP); Akitoshi Maeno, Fukui (JP)

(73) Assignee: Nidec Shibaura Corporation, Fukui (JP)

( * ) Notice: Subject to any disclaimer, the term of this patent is extended or adjusted under 35 U.S.C. 154(b) by 355 days.

(21) Appl. No.: 11/755,041

(22) Filed: May 30, 2007

(65) Prior Publication Data

US 2007/0290570 A1 Dec. 20, 2007

(30) Foreign Application Priority Data

May 30, 2006 (JP) .............................. 2006-150291

(51) Int. Cl.
*H02K 37/12* (2006.01)
(52) U.S. Cl. .................................. 310/49.32
(58) Field of Classification Search ................. 310/261, 310/71, 72, 90, 43, 83, 49.32
See application file for complete search history.

(56) References Cited

U.S. PATENT DOCUMENTS 4,267,461 A 5/1981 Grassmann 6,126,442 A * 10/2000 Knorpp et al. .............. 433/126

FOREIGN PATENT DOCUMENTS

| JP | 57-93072 U | 11/1980 |
|---|---|---|
| JP | 61-49571 U | 4/1986 |
| JP | 10-322965 A | 12/1998 |
| JP | 2004-229429 A | 8/2004 |

OTHER PUBLICATIONS

Official communication issued in counterpart Japanese Application No. 2006-150291, mailed on Nov. 21, 2008.

* cited by examiner

*Primary Examiner*—Javaid Nasri
(74) *Attorney, Agent, or Firm*—Keating & Bennett, LLP (57) ABSTRACT

A motor includes a shaft including upper and lower shaft members spaced axially away from each other. A shaft connecting member made of electrically insulating material is arranged axially between the upper and lower shaft members. The shaft connecting member is provided with fitting portions to which the upper and lower shaft members are to be fitted. While the upper and lower shaft members are secured to the shaft connecting member, the rotor magnet is integrally formed with the upper and lower shaft members and the shaft connecting member. With this configuration, an axial electric current is prevented from flowing through the shaft by the shaft connecting member.

19 Claims, 8 Drawing Sheets

MOTOR HAVING SHAFT MEMBERS

BACKGROUND OF THE INVENTION

1. Field of the Invention

The present invention relates to a motor. More particularly, the present invention relates to a structure for preventing electrochemical corrosion of a bearing in a motor.

2. Description of the Related Art

In motors driven by a higher voltage of 100 volts or higher and controlled by PWM (pulse width modulation) control, an axial electric current caused by a potential difference in the motor has been a problem for some time. The potential difference is produced by an unbalanced voltage applied to the motor, unevenness of a gap between a stator and a magnet, or a voltage change at a neutral point in PWM control, for example. That axial electric current causes an electric discharge in a bearing in which an electrically insulating layer exists, e.g., a roller bearing in which each of inner and outer rings is provided with an electrically insulating layer. The electric discharge roughens a bearing surface, especially a rolling surface of a roller bearing or a surface of a ball. Such a rough surface plays a role in causing abnormal noise.

Figure 7:
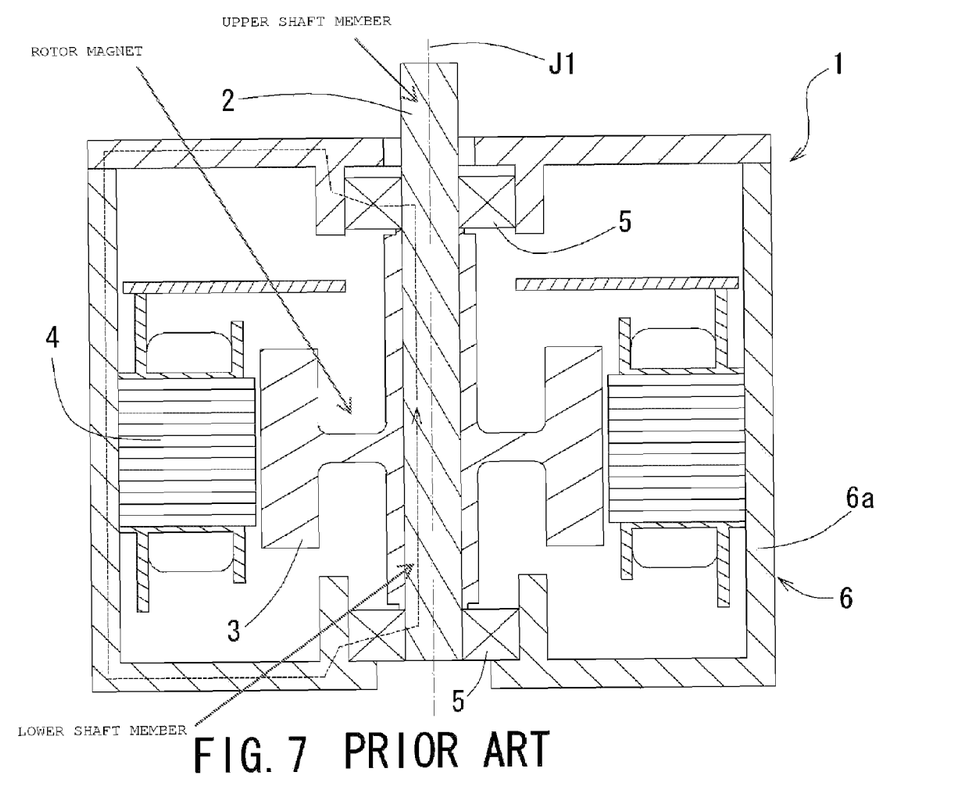
FIG. 7 is a cross-sectional view of a conventional exemplary motor, taken along a plane including a rotation axis of the motor.
Figure 8:
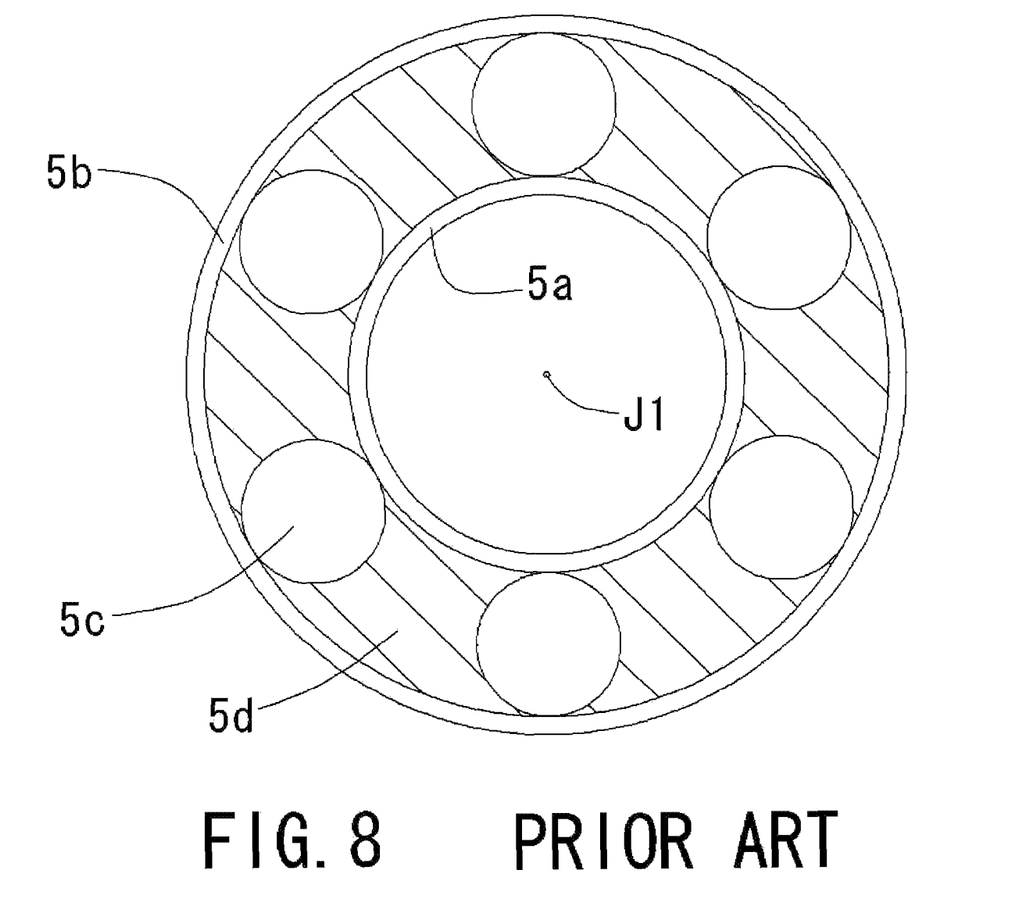
FIG. 8 is a plan view of a bearing, showing an inner structure thereof.

FIG. 7 shows a structure of an exemplary conventional motor driven at a high voltage. FIG. 7 is a cross-sectional view of the motor taken along a plane containing its axial direction. FIG. 8 is a plan view of a bearing of the motor, showing the inner structure thereof.

Referring to FIG. 7, the motor 1 includes a shaft 2 rotatable about a rotation axis J1, a rotor 3 secured to an axially central portion of the shaft 2, a stator 4 arranged outside the rotor 3 in a radial direction perpendicular to the rotation axis J1 with a gap therebetween, roller bearings 5 spaced axially away from each other and sandwiching the rotor 3 therebetween, and a frame 6 including a hollow and cylindrical portion 6a which secures the stator 4 thereto. The roller bearings 5 are retained by the frame 6. Referring to FIG. 8, each roller bearing 5 includes an inner ring 5a and an outer ring 5b. The inner ring 5a is secured to the shaft 2 and can rotate together with the shaft 2. The outer ring 5b is secured to the frame 6 and does not rotate. A plurality of balls 5c are in contact with both the inner and outer rings 5a and 5b. The balls 5c can rotate and revolve around the rotation axis J1. A space between the inner and outer rings 5a and 5b is filled with grease 5d. The roller bearing 5 further includes a retainer for retaining a circumferential gap between the balls 5c, although it is not shown in FIG. 8.

In the motor shown in FIG. 7, an axial electric current flows mainly through a path containing the frame 6, the roller bearing 5, and the shaft 2 in that order, as shown with dashed arrow. Referring to FIG. 8, when the axial electric current flows between the inner ring 5a and the outer ring 5b of the roller bearing 5, a spark occurs because the grease 5d is made of electrically insulating material. This spark roughens surfaces of the inner ring 5a and outer ring 5b, which are opposed to the balls 5c, and surfaces of the ball. That is, the roller bearing 5 is electrochemically corroded. Thus, an abnormal noise is generated during the operation of the roller bearing 5 in this state, and a life of the roller bearing 5 is shortened.

SUMMARY OF THE INVENTION

According to preferred embodiments of the present invention, a motor is provided. In the motor, a plurality of shaft members forming together a shaft coaxial with a rotation axis of the motor are connected to each other via a shaft connecting member which can electrically insulate the shaft members from each other. That is, the shaft members are not in direct contact with each other. The shaft connecting member prevents an axial electric current from flowing between the shaft members.

Instead of the shaft connecting member, a rotor magnet containing ferrite powders may be interposed axially between the shaft members. Since the rotor magnet containing ferrite powders has a high electrically insulating property, i.e., a high electric resistance, the axial electric current can be reduced well.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Referring to FIGS. 1 through 6, preferred embodiments of the present invention will be described in detail. It should be noted that in the explanation of preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Structure of Motor of an Exemplary Preferred Embodiment

Figure 1:
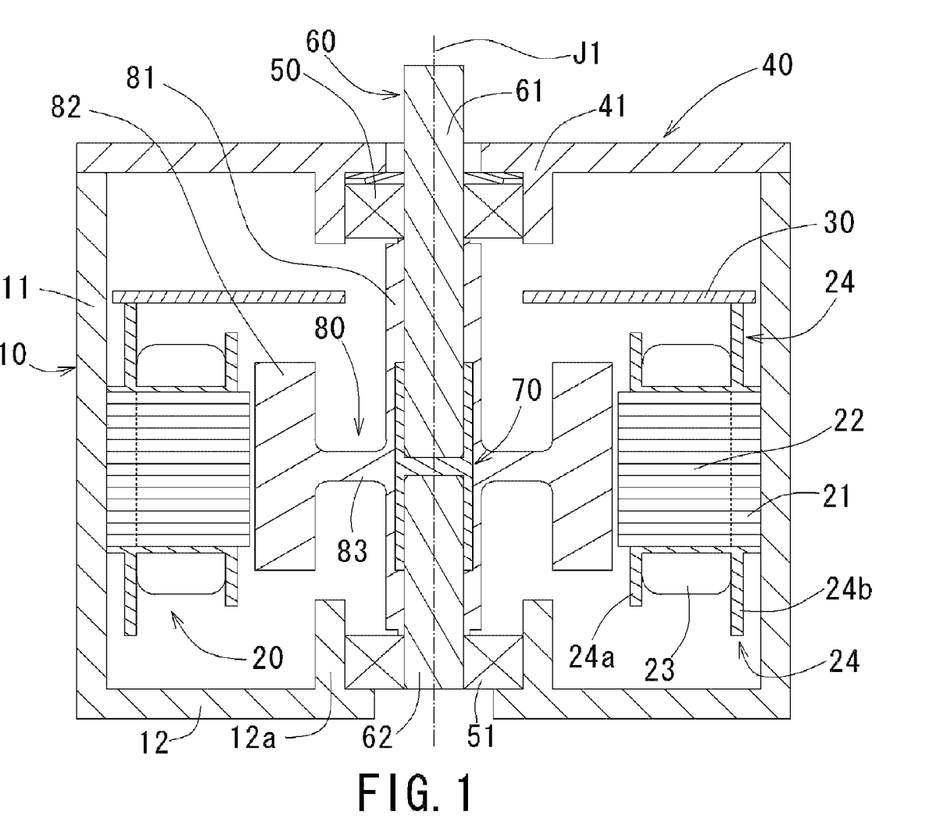
FIG. 1 is a cross-sectional view showing an entire structure of a motor according to a preferred embodiment of the present invention, taken along a plane including a rotation axis of the motor.

A motor according to an exemplary preferred embodiment of the present invention is now described referring to FIG. 1. FIG. 1 is a cross-sectional view of the motor when the motor is cut along a plane including a rotation axis J1 of the motor.

Referring to FIG. 1, a frame 10 is a hollow, approximately cylindrical steel plate with a bottom 12 and is preferably formed by plastic forming such as pressing. The frame 10 includes a body 11 centered approximately on the rotation axis J1 and extending upward from the bottom 12 in the axial direction. The bottom 12 includes a lower bearing holder 12a coaxial with the rotation axis J1. The lower bearing holder 12a is hollow and approximately cylindrical and extends upward in the axial direction.

An annular stator 20 is secured to an inner surface of the body 11 of the frame 10. The stator 20 includes a stator core, and a coil 23, and an insulator 24. The stator core preferably includes a plurality of axially laminated thin plates each having an annular core back 21 and a plurality of teeth 22 extending radially inwardly from the core back 21. The coil 23 is formed by winding a conductive wire around each tooth 22 of the stator core multiple times. The insulator 24 is interposed between the stator core and the coil 23 to electrically insulate them from each other. The insulator 24 has an inner wall 24a and an outer wall 24b which are disposed adjacent to an inner end and an outer end of the coil 23 in the radial direction, respectively. The inner and outer walls 24a and 24b prevent winding collapse.

A circuit board 30 where a circuit is disposed is provided axially above the stator 20. The circuit controls a current supply to the motor.

A bracket 40 is secured to an axially upper portion of the body 11 of the frame 10, i.e., a portion near an opening end of the frame 10, thereby closing the opening end of the frame 10. The bracket 40 includes an upper bearing holder 41 coaxial with the rotation axis J1. The upper bearing holder 41 extends axially downward.

Ball bearings 50 and 51 which are an example of roller bearings are provided in the upper bearing holder 41 and the lower bearing holder 12a, respectively. The ball bearings 50 and 51 support a shaft 60 coaxial with the rotation axis J1. Each of the ball bearings 50 and 51 preferably has the same structure as the bearing of FIG. 8 and includes inner and outer rings, a plurality of balls, a retainer, and grease.

The shaft 60 is divided into two shaft members, i.e., an upper shaft member 61 and a lower shaft member 62 axially between the ball bearings 50 and 51. The upper and lower shaft members 61 and 62 are connected with a shaft connecting member 70 preferably having a substantially H-shaped cross section. To an outer surface of the shaft connecting member 70 and an outer surface of the shaft 60 is fixed a rotor magnet 80. The rotor magnet 80 includes a fixed portion 81 fixed to the shaft connecting member 70 and the shaft 60, a magnetic driving portion 82 which faces the inner surfaces of the teeth 22 of the stator 20 and generates a rotating force, and a joint portion 83 which joins the fixed portion 81 and the magnetic driving portion 82 to each other.

When a current is supplied to the coil 23 of the stator 20 from an outside of the motor, the coil 23 generates a magnetic field. The thus generated magnetic field interacts with the magnetic driving portion 82 of the rotor magnet 80 so as to provide the rotating force to the motor.

Structure of Shaft, Shaft Connecting Member, and Rotor Magnet

Figure 2:
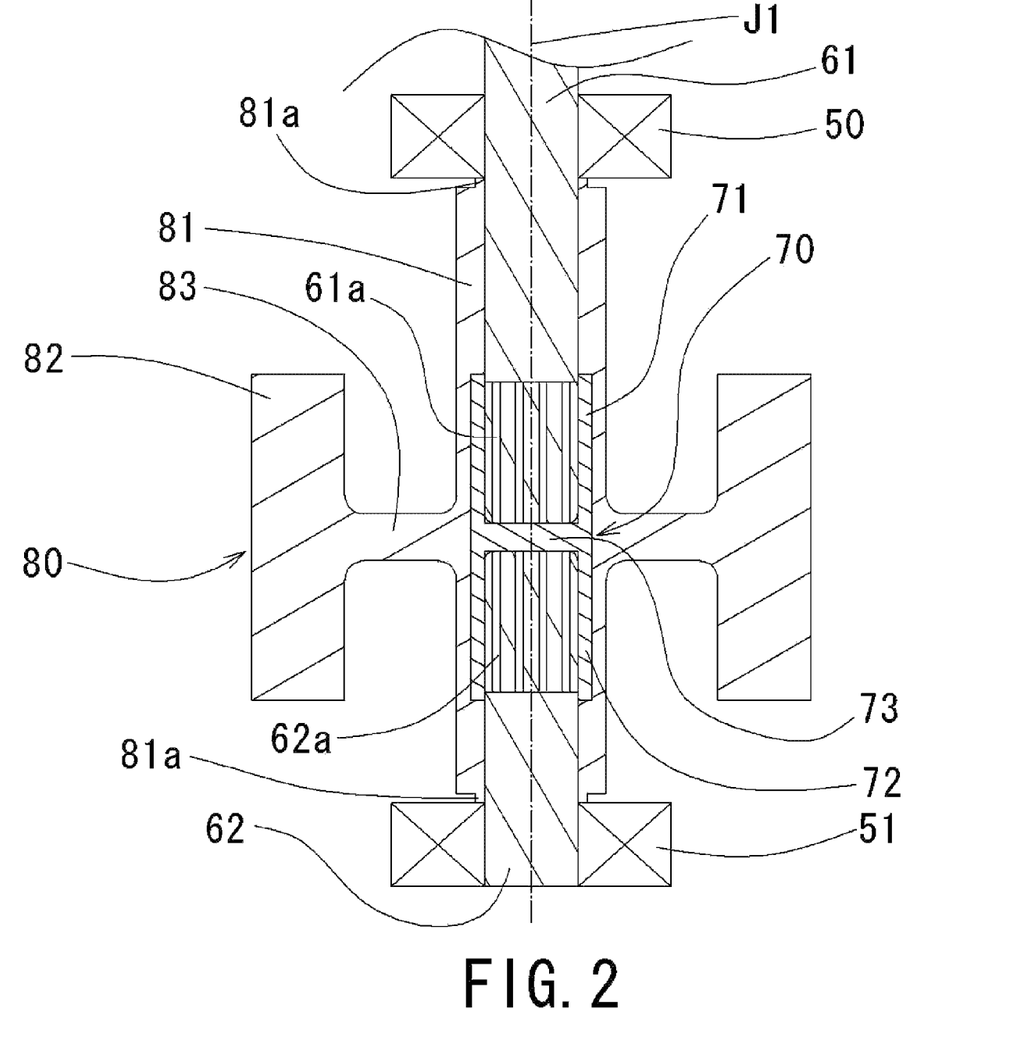
FIG. 2 is an enlarged cross-sectional view of a main portion of the motor of FIG. 1.

The structure of the shaft 60, shaft connecting member 70, and rotor magnet 80 is now described referring to FIG. 2. FIG. 2 is an enlarged cross-sectional view of a main part of the motor of FIG. 1. FIG. 2 shows a knurled portion of the shaft 60 for convenience of explanation, although the knurled portion cannot usually be seen in a cross section of the shaft 60 taken along a plane including the rotation axis J1.

Referring to FIG. 2, the shaft connecting member 70 is preferably made of electrically insulating resin. The shaft connecting member 70 has concave fitting portions 71 and 72 into which the upper and lower shaft members 61 and 62 are to be fitted, respectively. The upper and lower shaft members 61 and 62 are interference-fitted into and secured to the corresponding fitting portions, respectively. This interference-fit can secure the upper and lower shaft members 61 and 62 to each other in a precisely coaxial manner. The shaft connecting member 70 also includes a bottom portion 73 serving as bottoms of both the fitting portions 71 and 72. Due to the presence of the bottom portion 73, the upper and lower shaft members 61 and 62 can be surely separated from each other in the axial direction. With this configuration, even when a potential difference is produced within the motor, the bottom portion 73 can block a flow of an axial electric current between the upper and lower shaft members 61 and 62. That is, it is possible to prevent the axial electric current from flowing through the frame 10 and the ball bearings 50 and 51 and the shaft 60 in that order. Thus, electrochemical corrosion of the ball bearings 50 and 51 can be prevented.

The bottom portion 73 is preferably disposed at the same level as the joint portion 83 of the rotor magnet 80 in the axial direction, that is, at the same position as the joint portion 83 when seen in the radial direction. The joint portion 83 is disposed at approximately the same level as a magnetic center of the magnetic driving portion 82 of the rotor magnet 80 in the axial direction. Thus, the bottom portion 73 of the shaft connecting member 70 is also disposed at approximately the same level as the magnetic center of the magnetic driving portion 82 in the axial direction.

A portion of each of the upper and lower shafts 60 and 61, which is to be interference-fitted into the corresponding one of the fitting portions 71 and 72 of the shaft connecting member 70 has grooves 61a or 62a formed by knurling or the like. Due to the presence of the grooves 61a and 62a, fastening forces acting on between the upper and lower shaft members 61 and 62 and fitting portions 71 and 72, respectively, can be improved.

The fixed portion 81 of the rotor magnet 80 covers the outer surface of the shaft connecting member 70 from radially outside the shaft connecting member 70 and extends upward and downward in the axial direction. At each axial end of the fixed portion 81 is formed a projection 81a. The projection 81a is arranged adjacent to an associated one of the ball bearings 51 and 51 and applies a preload to the associated ball bearing 51 or 51.

The rotor magnet 80 is formed to have magnetic anisotropy.

Assembly Method of Shaft, Shaft Connecting Member, and Rotor Magnet

Figure 3:
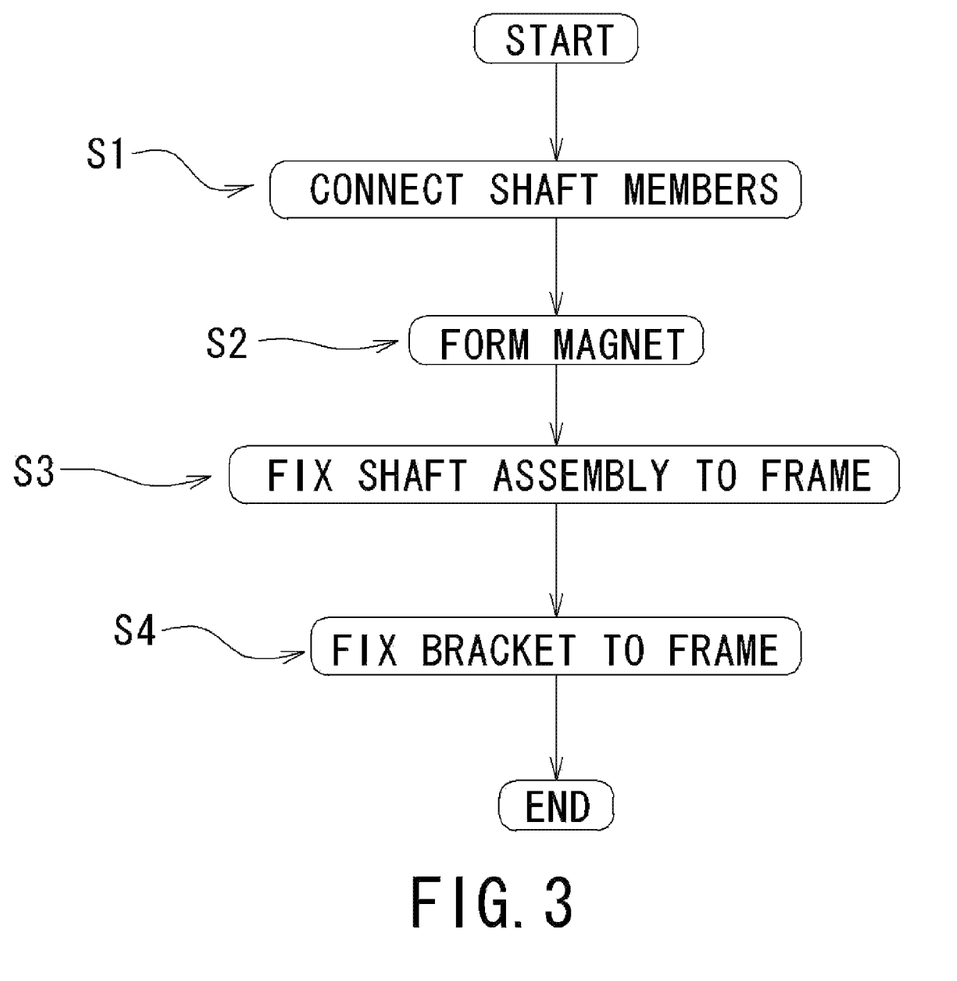
FIG. 3 shows processes of a motor manufacturing method according to a preferred embodiment of the present invention.

An example of how to assemble the shaft 60, the shaft connecting member 70, and the rotor magnet 80 is now described referring to FIG. 3.

First, the upper and lower shaft members 61 and 62 are interference-fitted into the fitting portions 71 and 72 of the shaft connecting member 70, respectively, to obtain a shaft assembly (Step S1). Therefore, the precision of coaxial arrangement of the upper and lower shaft members 61 and 62 is determined mainly by the precision of coaxial arrangement of the fitting portions 71 and 72 when the fitting portions 71 and 72 are formed.

Next, while the upper and lower shaft members 61 and 62 are connected to each other with the shaft connecting member 70, the rotor magnet 80 is formed by insertion molding (Step S2). In the insertion molding of the rotor magnet 80, material of the rotor magnet 80 is poured at a very high temperature into a mold (not shown). For this reason, it is preferable that the shaft connecting member 70 be made of thermosetting resin. In this case, melting and deformation of the shaft connecting member 70 can be prevented even if the temperature of the shaft connecting member 70 rises high in the insertion molding of the rotor magnet 80.

Then, the shaft assembly obtained in Step S1 is installed into the frame 10. More specifically, the shaft assembly with the ball bearing 51 fixed thereto is fixed to the frame 10 with the stator 20 and the circuit board 30 fixed to the inner surface of the body 11. (Step S3).

Finally, the body 11 of the frame 10 and the bracket 40 are fastened to each other while the ball bearing 50 is fixed to the upper shaft member 61 (Step S4).

Structure of Motor of Another Exemplary Preferred Embodiment

Figure 4:
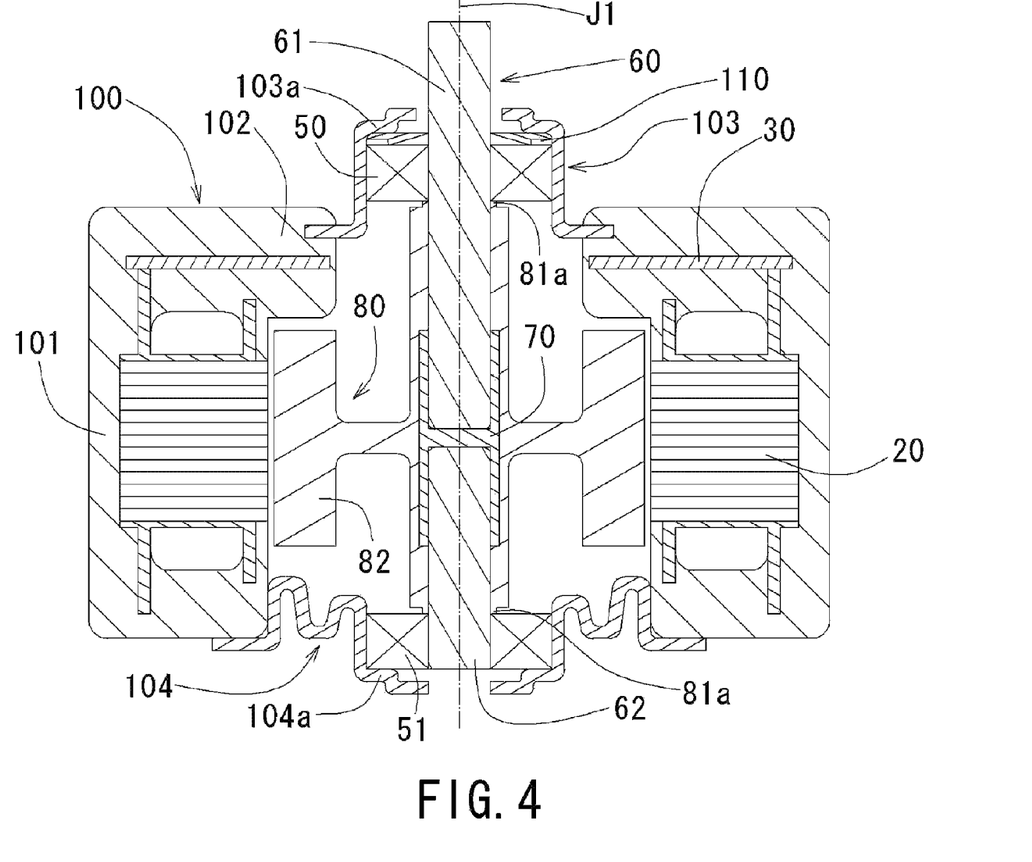
FIG. 4 is a cross-sectional view showing an entire structure of a motor according to another preferred embodiment of the present invention, taken along a plane including a rotation axis of the motor.

A motor according to another exemplary preferred embodiment of the present invention is now described referring to FIG. 4. Except for the frame 10 and the bracket 40, the components of the motor of this preferred embodiment have the same shapes as those shown in FIG. 1. Like components are given like reference numerals in FIGS. 1 and 4 and the detailed description thereof is omitted.

Referring to FIG. 4, the stator 20 and the circuit board 30 are integrally molded in a housing 100 made of molding material. The housing 100 is hollow and approximately cylindrical and includes a hollow and cylindrical body 101 and an extending portion 102 extending radially inwardly from an axially upper part of the body 101. The extending portion 102 is located axially above the magnetic driving portion 82 of the rotor magnet 80 and extends radially more inwardly than the radially outer surface of the magnetic driving portion 82. At a radially inner end of the extending portion 102, an upper bearing holder 103 for holding the ball bearing 50 is integrally formed by molding with the housing 100. The upper bearing holder 103 is a hollow, approximately cylindrical steel plate formed by plastic forming such as pressing. The ball bearing holder 103 has a cover 103*a* which covers the upper side of the ball bearing 50. A spring 110 is arranged axially between the ball bearing 50 and the cover 103*a* to be in contact with the outer ring of the ball bearing 50 and apply a preload to the ball bearing 50.

A lower bearing holder 104 for holding the ball bearing 51 is secured to an axially lower portion of the body 101 of the housing 100. The lower bearing holder 104 is a hollow, approximately cylindrical steel plate formed by plastic forming such as pressing. The lower bearing holder 104 is provided with a contact portion 104*a* which is in contact with an axially lower side of the outer ring of the ball bearing 51 and applies a preload to the ball bearing 51. Thus, the projections 81*a* of the rotor magnet 80, the spring 110, and the contact portion 104*a* apply preloads to the ball bearings 50 and 51.

The housing 100 is made of material having a high dielectric constant, e.g., unsaturated polyester. Thus, when a potential difference is produced in the motor, a path of an axial electric current including the housing 100, the upper bearing holder 103, the ball bearing 50, and the shaft 60 and another path including the housing 100, the lower bearing holder 104, the ball bearing 51, and the shaft 60 are formed. However, those paths are not electrically connected to each other between the upper and lower shaft members 61 and 62 forming the shaft 60 because the upper and lower shaft members 61 and 62 are electrically insulated from each other by the shaft connecting member 70 interposed axially between the shaft members 61 and 62. Thus, no axial electric current flows and therefore electrochemical corrosion of the ball bearings 50 and 51 can be prevented.

Other Structures of Shaft, Shaft Connecting Member, and Rotor Magnet

Figure 5:
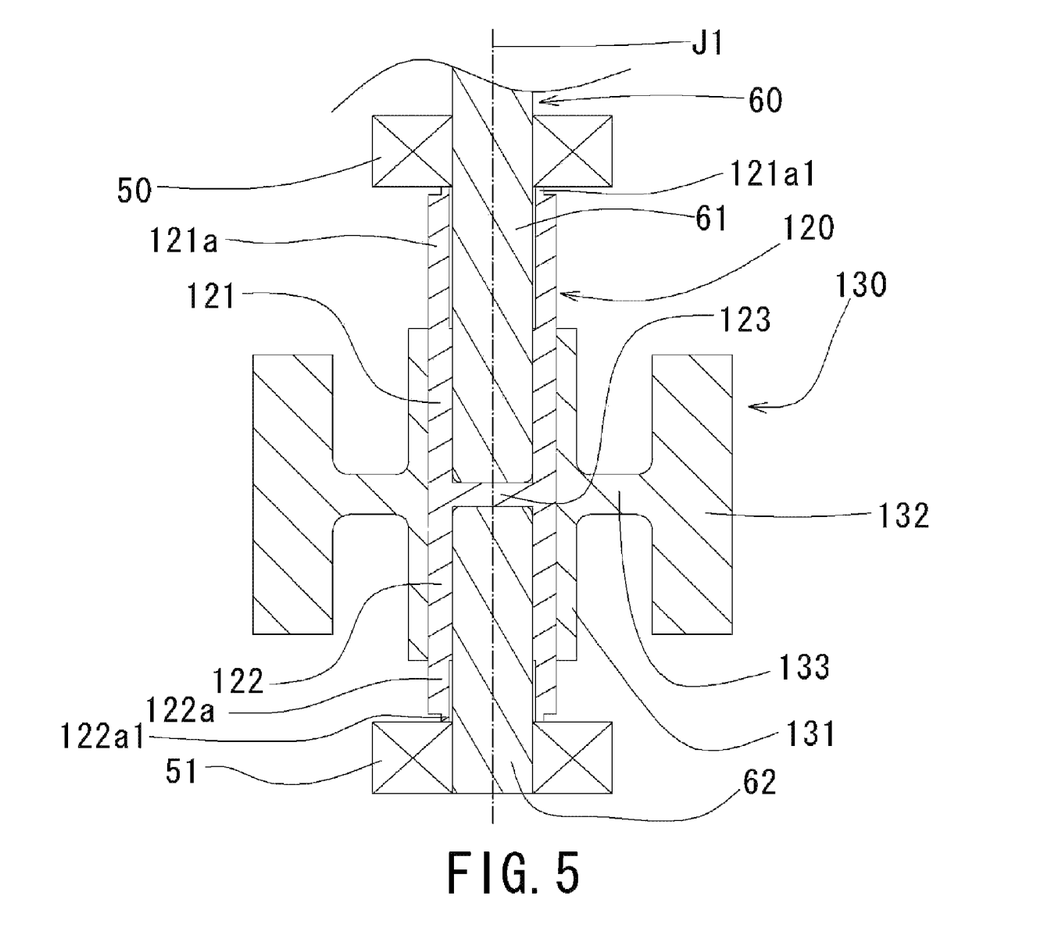
FIG. 5 is an enlarged cross-sectional view of a main part of a motor according to still another preferred embodiment of the present invention.
Figure 6:
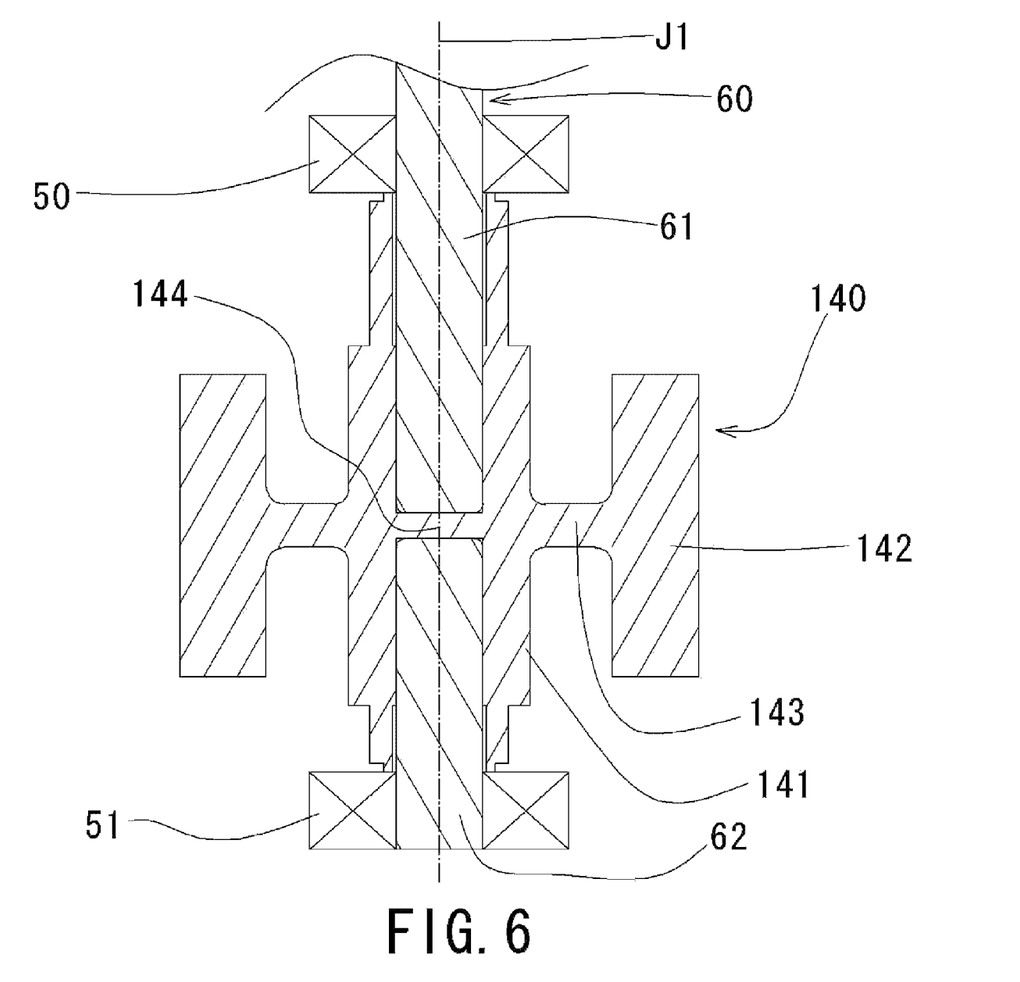
FIG. 6 is an enlarged cross-sectional view of a main part of a motor according to further another preferred embodiment of the present invention.

The structure of the shaft, shaft connecting member, and rotor magnet in motors according to other preferred embodiments of the present invention is now described referring to FIGS. 5 and 6. Since the shaft 60 has the same shape as that described in the above preferred embodiments, the same reference numeral is used in FIGS. 5 and 6. FIGS. 5 and 6 are cross-sectional views showing the arrangements of the shaft, shaft connecting member, and rotor magnet, taken along a plane including the rotation axis J1. FIGS. 5 and 6 show different arrangements from each other.

First, the preferred embodiment shown in FIG. 5 is described. Referring to FIG. 5, a shaft connecting member 120 is made of electrically insulating resin and preferably has a substantially H-shaped cross section that is preferably formed by molding. The shaft connecting member 120 has concave fitting portions 121 and 122 to which the upper and lower shaft members 61 and 62 are fitted, respectively. The upper and lower shaft members 61 and 62 are interference-fitted into and secured to the fitting portions 121 and 122, respectively. The shaft connecting member 120 also has a bottom portion 123 axially between the fitting portions 121 and 122. Due to the presence of the bottom portion 123, the upper and lower shaft members 61 and 62 can be surely separated from each other in the axial direction. The shaft connecting member 120 further has shaft receiving portions 121*a* and 122*a* axially extending from the fitting portions 121 and 122 to the ball bearings 50 and 51, respectively. The upper and lower shaft members 61 and 62 are respectively inserted into and received by the fitting portions 121 and 122. Each of the shaft receiving members 121*a* and 122*a* is provided with a projection 121*a*1 or 122*a*1 at its ball-bearing side. The projections 121*a*1 and 122*a*1 are in contact with inner rings of the corresponding ball bearings 50 and 51 to apply preloads to the corresponding ball bearings 50 and 51, respectively.

A rotor magnet 130 has a fixed portion 131 fixed to an outer surface of the shaft connecting member 120, a magnetic driving portion 132 facing the inner surfaces of the teeth 22 of the stator 20 in the radial direction, and a joint portion 133 which joins the fixed portion 131 and the magnetic driving portion 132 to each other. The rotor magnet 130 is formed by insertion molding while the shaft 60 and the shaft connecting member 120 are fastened to each other. Thus, the shaft 60 and the rotor magnet 130 are not in direct contact with each other. Accordingly, an axial electric current passing through the stator 20, the rotor magnet 130 and the shaft 60 in that order can be blocked by the shaft connecting portion 120. Moreover, since the rotor magnet 130 and the ball bearings 50 and 51 are not in contact with each other, it is possible to prevent the axial electric current flowing through the rotor magnet 130 and blocked by the shaft connecting portion 120 from flowing through the ball bearings 50 and 51. Consequently, electrochemical corrosion of the ball bearings 50 and 51 can be more surely prevented.

Next, the preferred embodiment shown in FIG. 6 is described. Referring to FIG. 6, a rotor magnet 140 is formed by insertion molding to axially connect the upper and lower shaft members 61 and 62 to each other. That is, the rotor magnet 140 fixes the upper and lower shaft members 61 and 62 thereto. It is preferable that the rotor magnet 140 be a plastic magnet containing ferrite powders. Plastic magnets containing ferrite powders are generally made of electrically insulating material. Thus, an electric resistance of the rotor magnet 140 is very high. Due to the high electric resistance of the rotor magnet 140, an axial electric current passing through the stator 20, the rotor magnet 140, and the shaft 60 in that order can be blocked by the rotor magnet 140.

The rotor magnet 140 has a fixed portion 141 fixed to the outer surfaces of the upper and lower shaft members 61 and 62, a magnetic driving portion 142 facing the inner surfaces of the teeth 22 of the stator 20 in the radial direction, and a joint portion 143 which joins the fixed portion 141 to the magnetic driving portion 142. The fixed portion 141 has a contact portion 144 which is in contact with one axial ends of the upper and lower shaft members 61 and 62. The contact portion 144 reliably separates the upper and lower shaft members 61 and 62 away from each other in the axial direction. Thus, an axial electric current flowing axially between the upper and lower shaft members 61 and 62 can be blocked.

The preferred embodiments of the present invention have been described above. However, the present invention is not limited thereto.

In the above-described preferred embodiments, the upper and lower shaft members 61 and 62 are preferably interference-fitted into and secured to the shaft connecting member 70. However, the present invention is not limited thereto. For example, the shaft connecting member 62 may be integrally molded with the upper and lower shaft members 61 and 62 while the upper and lower shaft members 61 and 62 are arranged with an axial gap therebetween in a mold (not shown).

Moreover, in the first preferred embodiment, the axially extending grooves 61a and 62a are preferably provided on the upper and lower shaft members 61 and 62 in order to enhance forces for fastening the upper and lower shaft members 61 and 62 to the fitting portions 71 and 72 of the shaft connecting member 70, respectively. However, the shape of the grooves 61a and 62a are not limited thereto. The grooves 61a and 62a may have any shape as long as it can enhance the fastening forces. For example, the grooves 61a and 62a may be spiral grooves.

In the preferred embodiment shown in FIG. 5, the grooves 61a and 62a are not shown at positions on the upper and lower shaft members 61 and 62 that correspond to the fitting portions 121 and 121, respectively. However, also in the preferred embodiment shown in FIG. 5, forming the grooves 61a and 62a is suitable for enhancing a force fastening the shaft 60 and the shaft connecting member 120 to each other.

Furthermore, each of the main elements and components shown in FIGS. 2, 5, and 6 can be applied to any of the motors shown in FIGS. 1 and 4.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
   a shaft coaxially arranged with a rotation axis of the motor;
   a rotor magnet integrally rotatable with the shaft;
   a stator facing the rotor magnet in a radial direction that is substantially perpendicular to the rotation axis; and
   a bearing supporting the shaft in a rotatable manner; wherein the shaft includes at least two shaft members spaced axially away from each other; and
   the rotor magnet is a plastic magnet at least partially arranged axially between the at least two shaft members and holds the at least two shaft members.

2. A motor according to claim 1, wherein the rotor magnet is integral with the at least two shaft members.

3. A motor according to claim 1, wherein the rotor magnet contains ferrite powders.

4. A motor comprising:
   a shaft coaxial with a rotation axis of the motor;
   a rotor magnet integrally rotatable with the shaft;
   a stator facing the rotor magnet in a radial direction that is substantially perpendicular to the rotation axis; and
   a bearing supporting the shaft in a rotatable manner; wherein the shaft includes at least two shaft members spaced axially away from each other; and
   a shaft connecting member is provided axially between the at least two shaft members to connect the at least two shaft members to each other, the shaft connecting member being made of electrically insulating material.

5. A motor according to claim 4, wherein the shaft connecting member is integral with the at least two shaft members.

6. A motor according to claim 4, wherein the shaft connecting member includes fitting portions to which first ends of the at least two shaft members are to be fitted, respectively.

7. A motor according to claim 6, wherein the first ends of the shaft members are fitted into the fitting portions, and the fitting portions have an inner diameter that is smaller than an outer diameter of the first ends of the at least two shaft members which face the fitting portions in the radial direction.

8. A motor according to claim 4, wherein the shaft connecting member is made of thermosetting resin.

9. A motor according to claim 4, wherein the rotor magnet includes a fixed portion fixed to at least one of the shaft connecting member and the at least two shaft members, and a magnetic driving portion facing the stator in the radial direction.

10. A motor according to claim 9, wherein the fixed portion is in contact with the shaft connecting member only.

11. A motor according to claim 4, wherein the rotor magnet contains ferrite powders.

12. A motor according to claim 4, wherein the motor is a DC brushless motor and is controlled by PWM control.

13. A motor according to claim 4, further comprising a circuit board arranged at or near one axial end of the stator and electrically connected to the stator, and a housing made of molding material, wherein
   the stator and circuit board are integrally molded in the housing, and
   the housing includes a bearing holder arranged to hold the bearing.

14. A motor according to claim 13, wherein the housing is made of unsaturated polyester and molds the stator and the circuit board.

15. A manufacturing method of a motor including:
   at least two shaft members arranged coaxially with a rotation axis of the motor and spaced axially away from each other;
   a rotor magnet rotatable together with the at least two shaft members; and
   a shaft connecting member connecting the at least two shaft members to each other, the shaft connection member being made of electrically insulating material, the method comprising:
   a) securing the at least two shaft members to the shaft connecting member; and
   b) integrally forming the rotor magnet with the at least two shaft members.

16. The method according to claim 15, wherein step of securing the at least two shaft members to the shaft connecting member includes interference-fitting the at least two shaft members to respective fitting portions of the shaft connecting member.

17. The method according to claim 15, wherein after the securing step, the shaft connecting member is disposed between and axially separates the at least two shaft members.

18. The method according to claim 15, wherein the shaft connecting member is made of thermosetting resin.

19. The method according to claim 15, wherein after the securing step, the shaft connecting member is arranged to block a flow of an axial electric current between the at least two shaft members.

* * * * *